Figure 1:
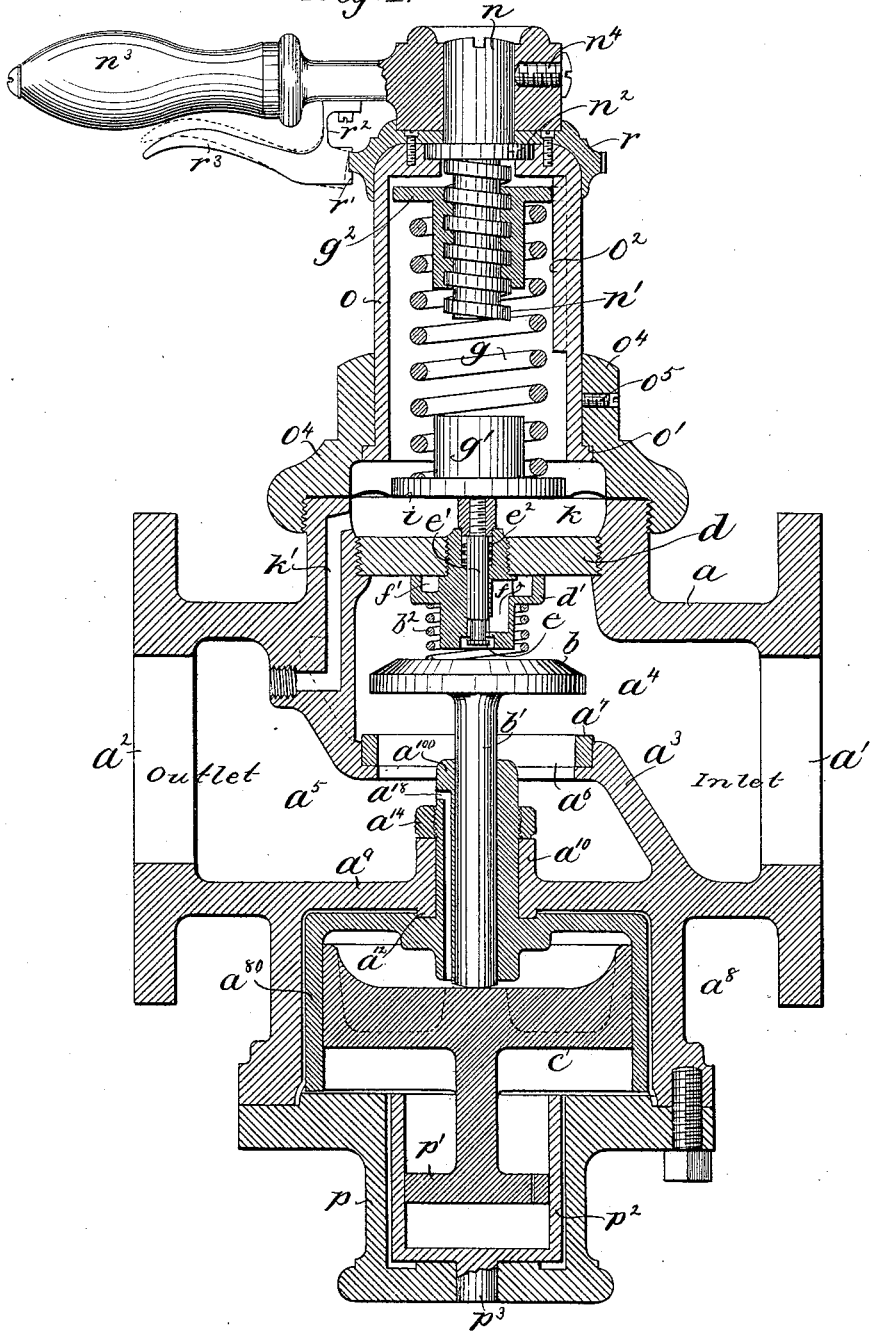

(No Model.) 2 Sheets—Sheet 1.

W. B. MASON.
FLUID PRESSURE REGULATOR.

No. 379,586. Patented Mar. 20, 1888.

Witnesses.
Jas. J. Maloney.
M. E. Hill,

Inventor,
Wm. B. Mason,
by Jos. P. Livermore
Att'y.

(No Model.) 2 Sheets—Sheet 2.
W. B. MASON.
FLUID PRESSURE REGULATOR.
No. 379,586. Patented Mar. 20, 1888.
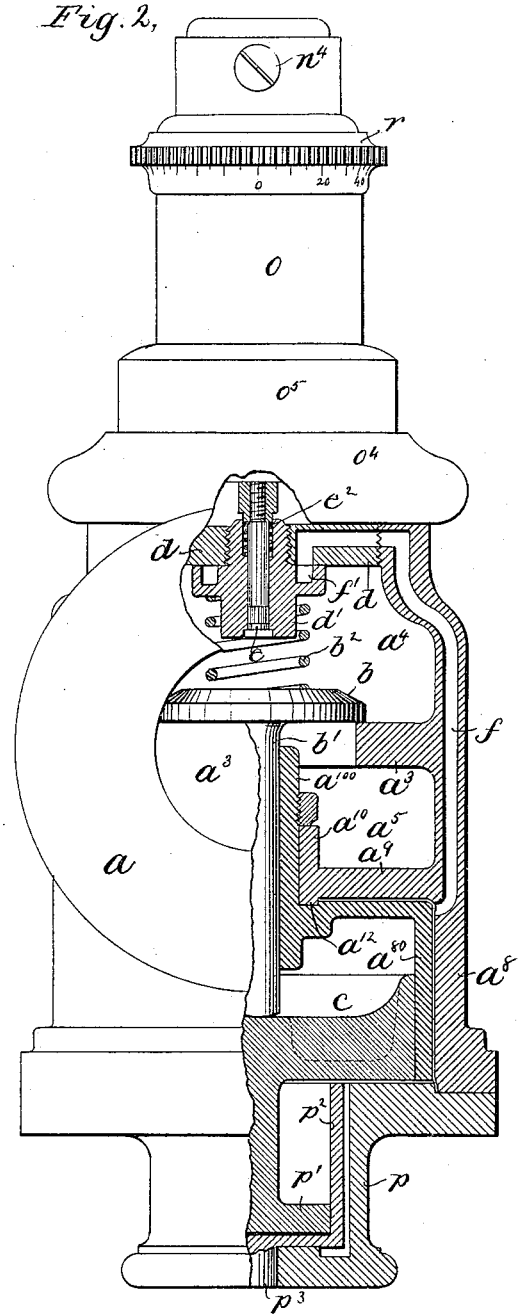
Witnesses,
Jas. J. Maloney.
M. E. Hill
Inventor,
Wm. B. Mason,
by Jos. P. Livermore.
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

FLUID-PRESSURE REGULATOR.

SPECIFICATION forming part of Letters Patent No. 379,586, dated March 20, 1888.

Application filed July 1, 1887. Serial No. 243,078. (No model.)

*To all whom it may concern:*

Be it known that I, WILLIAM B. MASON, of Boston, county of Suffolk, State of Massachusetts, have invented an Improvement in Fluid-Pressure Regulators, of which the following description, in connection with the accompanying drawings, is a specification, like letters on the drawings representing like parts.

My invention, relating to fluid-pressure regulators, is shown embodied in a pressure-regulator of the class commonly called a "reducing-valve," by which the pressure of the fluid that passes through the valve is not permitted to rise above a predetermined amount, the valve closing and cutting off the fluid on the inlet side when the pressure rises to the required amount at the outlet side of the valve.

The invention is embodied in a valve having substantially the same principle of operation as that of the valve shown and described in Letters Patent No. 361,771, dated April 26, 1887, to which reference may be had.

The present invention consists, mainly, in a novel device for readily operating and adjusting the pressure at which the valve works, and also in details of construction by which the operation of the valve is rendered more perfect.

The means for adjusting the pressure at which the valve works are especially applicable when the valve is used in connection with steam-heating apparatus for railway-cars—for example, when it is desirable to give a considerable range to the pressure at which the steam is admitted to the heating apparatus, although the said pressure is to be maintained uniform at any given point for which the valve may be set by the engineer. For example, the steam is admitted at a high pressure when the cars are first attached to the locomotive and have to be heated up; but after they are once heated they can be retained at the proper temperature by a much smaller quantity of steam, and the pressure at which the valve delivers the steam is consequently reduced by the engineer.

The main valve that governs the flow of steam from the inlet to the outlet of the valve shell or casing is controlled by a secondary valve operated by a piston or diaphragm exposed to the pressure of the fluid in the outlet portion of the valve-shell and actuated in one direction by the said fluid when its pressure rises to the desired point and in the other direction by a regulating-spring, which overcomes the fluid-pressure on the diaphragm when the latter falls below the predetermined point.

The present invention consists partly in the combination of said actuating piston or diaphragm for the secondary valve and the regulating-spring that bears on said piston or diaphragm with a follower bearing on the other end of said spring and an adjusting-lever and fastening device therefor controlling the position of the said follower, and consequently the amount of compression of the spring, so that by turning the said lever and fastening it at the desired point the spring may be made to exert any desired amount of force.

The invention also consists in a novel arrangement of a lining or internal cylinder in which the main piston that operates the main valve works, this construction and arrangement being especially applicable where the main portion of the valve-shell is made of different material from the internal working parts—as, for example, when the said shell is of cast iron and the working parts of brass or composition.

The invention also consists in various novel features of construction, hereinafter pointed out.

Figure 1 is a longitudinal vertical section of a reducing-valve embodying this invention, being shown with the parts in the position occupied when the main valve is open; and Fig. 2, an end elevation, partly in section, showing the parts in the position occupied when the main valve is closed, the planes of the sections in Figs. 1 and 2 being at right angles to one another.

The main body or valve-shell $a$, having the inlet and outlet openings $a'$ $a^2$, separated by a partition, $a^3$, provided with a port or opening, $a^6$, connecting the inlet and outlet chambers $a^4$ $a^5$, formed in the shell by the said partition, and the main valve $b$, co-operating with the seat $a^7$ around the said port $a^6$, and the actuating piston $c$ for the said main valve may be and are shown as constructed and arranged to operate substantially like the corresponding parts shown in the said Patent No. 361,771, before referred to, the said actuating-piston $c$ being provided with a regulating-piston, $p'$, as shown and described in said patent.

The actuating-piston $c$ is contained in an extension, $a^8$, below the outlet portion $a^5$ of the valve-shell, and communicating therewith by passage $a^{18}$, so that the upper surface of the said actuating-piston $c$ is exposed to the pressure of the fluid in the outlet portion $a^5$ of the valve-shell, as is the under surface of the valve $b$, while the upper surface of the said valve $b$ is exposed to the pressure of the fluid on the inlet side of the partition and is of less area than its actuating-piston $c$, the said areas being preferably in about the ratio of one to two. When the valve-shell $a$ is of different material from the piston $c$—as, for example, when the former is of iron and the latter of brass—it is not desirable to have the said piston work directly in the walls of the casing, owing to the unequal expansion of the different metals, which may cause the piston to bind or work too loose, and in such cases the shell is provided with a lining, $a^{80}$, made of smaller external diameter than the bore or internal diameter of the chamber $a^8$, the said lining-piece $a^{80}$ having a central stem or tubular projection, $a^{100}$, passing through the central opening or bearing, $a^{10}$, in the partition $a^9$, that separates the extension $a^8$ from the outlet-chamber $a^5$ of the valve-casing. The said portion $a^{10}$ of the main shell is provided with an annular projection, $a^{12}$, which enters a corresponding annular recess or groove in the lining-piece $a^{80}$, as clearly shown in Fig. 1, and the upper portion of the stem $a^{100}$ is threaded to receive a nut, $a^{14}$, which, when screwed down tightly, clamps the said stem $a^{100}$ within the portion $a^{10}$ of the main casing, and thus securely holds the lining $a^{80}$ in the shell properly centered with relation to the other parts, while the cylindrical walls of the said lining are perfectly free to expand or contract independently of the outer shell—an advantage not obtained by the usual method of constructing linings for similar purposes, in which said linings are driven tightly into the shell or material which they line.

The stem $b'$ of the valve $b$ is not connected with the piston $c$, but merely bears against it and works within the tubular fastening portion $a^{100}$ of the lining $a^{80}$ as a guide, and thus all danger of binding or harsh movement is avoided which might arise if the said stem and piston were connected and the bore of the portions $a^{80}$ and $a^{100}$ were slightly out of line. The piston $c$ and valve $b$ always act upon one another by pressure on the stem $b'$ in the operation of the valve, so that no connection is required between the stem and piston for the proper working.

The secondary or governing valve $e$ works in a cap or top piece, $d$, over the inlet portion $a^4$ of the valve-shell and controls a port or passage, $f$, (see Fig. 2,) that leads from the said inlet-chamber $a^4$ to the space below the valve-actuating piston $c$, the said port being shown as entering the space between the chamber $a^8$ and lining $a^{80}$, and thence passing into the open under side of the lining below the said piston $c$. The stem $e'$ of the said controlling-valve $e$ is operated by a piston or diaphragm, $i$, forming one side of a pressure-chamber, $k$, communicating through a port or passage, $k'$, with the outlet portion $a^5$ of the main-valve shell, so that the said diaphragm is acted upon in the direction to raise it and permit the closing of the valve $e$ by the pressure of the fluid on the outlet side of the valve, said valve $e$ being moved up against the diaphragm by a spring, $e^2$, and operating substantially the same as described in the patent before referred to.

The piston or diaphragm $i$ has a rigid portion, $g'$, that receives the pressure of the controlling-spring $g$, which is itself acted upon at its other end by a follower, $g^2$, the position of which is adjusted and controlled by an adjusting device, $n$, shown in this instance as a plug or rod having a thread, $n'$, of steep pitch, working in the said follower $g^2$ as a nut, and a flange, $n^2$, by which the said plug is prevented from moving longitudinally, while permitted to rotate. The said flange $n^2$ is confined within a shoulder formed at the upper end of a cylindrical chamber, $o$, that incloses the spring $g$, and is provided at its lower end with a shoulder, $o'$, engaged by a base piece or cap, $o^4$, that is fastened upon the valve-shell above the pressure-chamber $k$ and supports the operative parts above the diaphragm $i$. The flange $n^2$ is confined upon the top of the chamber $o$ by a ring, $r$, provided with teeth or projections, as best shown in Fig. 2, the purpose of which will be hereinafter described.

The plug $n$ above the ring $r$ has connected with it a handle, $n^3$, by which the said plug may be turned axially with relation to the nut or follower $g^2$, that engages the upper end of the spring $g$. The said follower $g^2$ is provided with a notch that receives a rib or feather, $o^2$, on the inside of the chamber $o$, which prevents the said nut from turning when the plug $n$ is turned, so that the rotation of the said plug $n$, with its screw-thread $n'$, produces a longitudinal movement of the follower $g^2$, and thereby varies the pressure of the spring on the diaphragm $i$. The thread $n'$ is preferably so proportioned that a small movement of the handle $n^3$—for example, not over a quarter or a half turn—gives any required adjustment of the force of the spring $g$.

In order to facilitate the proper adjustment of the spring $g$ and to keep it in the same condition when once adjusted, the said handle-lever $n^3$ is provided with a latch or fastening device, $r'$, connected with the handle $n^3$ by a spring portion, $r^2$, and provided with a handle, $r^3$, extending along under the handle $n^3$, so that it can be operated at the same time therewith. The said locking device $r'$ co-operates with the notches in the toothed ring $r$, which may be graduated, if desired, as indicated at Fig. 2, to indicate the pressures in the outlet portion of the valve corresponding to the different positions of the adjusting-lever $n^3$.

When it is desired to change the pressure at which the fluid shall be delivered through the valve, the operator grasps the handles $n^3$ and $r^3$, moving the latter to the dotted-line position, Fig. 1, and thus disengages the fastening device $r'$ from the co-operating ring $r$, and then turns the handle $n^3$ to the desired point, when, by releasing the handle $r^3$, the locking device will snap into the corresponding notch in the ring $r$ and retain the handle $n^3$ in this position until another adjustment is required.

The handle $n^3$ is fastened upon the plug $n$ by a screw, $n^4$, and the said plug is provided with a screw-driver slot, as shown, so that by loosening the said screw $n^4$ the plug may be turned until the stress of the spring corresponds to the graduation at which the fastening device $r'$ stands, after which the handle may be securely fastened by the set-screw $n^4$ and used to operate the plug $n$.

In setting up the valve it will be found that it is often desirable to change the position of the handle $n^3$ with relation to the main body of the valve, and it is for this reason that the cylindrical chamber $o$ is made separate from the base-piece $o^4$ and engaged with it by the shoulder $o'$, as shown, since this construction enables the said chamber $o$, together with the spring and its operating devices, to be all turned bodily with relation to the valve to place the handle $n^3$ in the most convenient position with relation to the valve-body without changing at all the relation of the spring-operating devices to one another, and when the said chamber and connected parts are turned to the proper position it is fastened by a set-screw, $o^5$. These means for adjusting the pressure at which a reducing-valve is to work are simple and efficient, and are obviously equally applicable to any form of reducing-valve in which the main valve is controlled by the movement of a piston or diaphragm acted upon by the pressure of the fluid and the opposed force of a spring, and the invention, so far as relates to the construction of the spring-adjusting device, is therefore not limited to any specific construction of the main valve and its controlling and operating parts.

The movement of the main valve $b$ and its actuating-piston $c$ is steadied by a regulating-piston, $p'$, having a somewhat loose fit in a cylinder, $p^2$, formed in a projection, $p$, that closes the lower end of the cylinder or chamber $a^8$, that contains the main piston $c$. This regulating-piston $p'$ operates to prevent sudden movements of the main valve $b$, so that it cannot hammer or pound on its seat, and the cylinder $p^2$, in which it works, is shown as a lining-piece having its external diameter smaller than the internal diameter of the chamber $p$, and it is provided with a central stem, $p^3$, which supports it in said chamber $p$, so that the cylindrical portion of the said cylinder or lining $p^2$ is wholly unconfined by its inclosing-chamber $p$, like the cylindrical portion of the lining-piece $a^{80}$, in which the main piston $c$ works. This construction of the lining-pieces $p^2$ and $a^{80}$ is applicable to other forms of pressure-regulating or other apparatus, and the invention, so far as relates to the construction and mode of supporting the lining, is not limited to the specific construction of the valve as a whole.

For convenience in construction the piece $d$, that contains the secondary valve, is made in two parts, the part $d'$, that contains the valve, being screwed into the main part and having an annular groove, $f'$, as shown, which connects a portion of the passage $f$, that is formed in said part $d'$, as shown in Fig. 1, with the portion that is formed in the part $d$ and in the main shell $a$, as shown in Fig. 2.

The main valve $b$ is preferably acted upon by a light spring, $b^2$, that serves to keep the valve seated when no fluid is admitted to the valve, but does not appreciably affect the operation of the valve when the fluid is flowing through it, said valve then being operated by the pressure of the fluid on the said valve and its actuating-piston $c$.

I claim—

1. The combination of the main shell having a cylindrical chamber with a cylindrical lining-piece and piston working therein, the said lining-piece having an axial projection by which it is fastened to the main shell and having its external diameter smaller than the internal diameter of the cylindrical chamber in the main shell which it lines, substantially as described.

2. In a pressure-regulating device, a piston or diaphragm exposed at one side to the fluid the pressure of which is to be regulated, combined with a spring acting on said piston or diaphragm, an abutment or follower for said spring, having an internal screw-thread, and being restrained from rotary movement, an adjusting plug provided with a screw-thread co-operating with said follower and restrained from longitudinal movement, and a lateral handle-lever connected with said plug, substantially as and for the purpose set forth.

3. In a pressure-regulating device, a piston or diaphragm exposed at one side to the fluid the pressure of which is to be regulated, combined with a spring acting on said piston or diaphragm in opposition to the pressure of the said fluid, an abutment or follower for said spring, an adjusting device therefor having a rotary movement, and a lateral handle-lever for said adjusting device, and a chamber inclosing the said spring, having a base-piece fastened to the shell of the valve and a portion capable of rotary movement thereon for the purpose of setting the said handle in any desired position, substantially as described.

In testimony whereof I have signed my name to this specification in the presence of two subscribing witnesses.

WM. B. MASON.

Witnesses:
JOS. P. LIVERMORE,
JAS. J. MALONEY.